United States Patent
Kang et al.

(10) Patent No.: US 7,781,523 B2
(45) Date of Patent: Aug. 24, 2010

(54) STYRENE-BASED THERMOPLASTIC RESIN COMPOSITIONS WITH VERY LOW GLOSS AND HIGH IMPACT STRENGTH

(75) Inventors: Byoung-il Kang, Daejeon (KR); Han-jong You, Daejeon (KR); Seong-lyong Kim, Daejeon (KR)

(73) Assignee: LG Chem, Ltd. (KR)

( * ) Notice: Subject to any disclaimer, the term of this patent is extended or adjusted under 35 U.S.C. 154(b) by 1086 days.

(21) Appl. No.: 10/565,857

(22) PCT Filed: Aug. 26, 2005

(86) PCT No.: PCT/KR2005/002833

§ 371 (c)(1),
(2), (4) Date: Jan. 25, 2006

(87) PCT Pub. No.: WO2006/022528

PCT Pub. Date: Mar. 2, 2006

(65) Prior Publication Data

US 2006/0252875 A1    Nov. 9, 2006

(30) Foreign Application Priority Data

Aug. 27, 2004    (KR) .................. 10-2004-0068088

(51) Int. Cl.
*C08L 51/04* (2006.01)
*C08L 37/00* (2006.01)
*C08F 279/04* (2006.01)

(52) U.S. Cl. .................. 525/74; 525/78; 525/942

(58) Field of Classification Search .................. 525/74, 525/78, 942
See application file for complete search history.

(56) References Cited

U.S. PATENT DOCUMENTS

| 4,894,416 A | 1/1990 | Gallucci ............... 525/74 |
| 5,430,101 A * | 7/1995 | Minematsu et al. ...... 525/73 |

FOREIGN PATENT DOCUMENTS

| JP | 01-101355 | 4/1989 |
| JP | 03-95252 | 4/1991 |
| JP | 03-221551 | 9/1991 |
| JP | 04-353551 | 12/1992 |
| JP | 04-353552 | 12/1992 |

OTHER PUBLICATIONS

English language translation of JP 3-095252; publication date: Apr. 1991.*
English language translation of JP 4-353552; publication date: Dec. 1992.*
English language translation of JP-6456762; published Mar. 3, 1989.*

* cited by examiner

*Primary Examiner*—Fred M Teskin
(74) *Attorney, Agent, or Firm*—Cantor Colburn LLP

(57) ABSTRACT

The present invention relates to styrene-based thermoplastic resin compositions in which 1-10 weight part of a low-gloss additive selected from a group consisting of polyolefin copolymer(C) containing glycidyl methacrylate functional groups, styrene polymer(D) harboring two or more carboxyl functional groups per molecule, and a mixture of them, was added to 100 weight part of basic resin composed of 30-70 weight part of graft copolymer(A) containing rubber modified styrene and 30-70 weight part of copolymer(B) harboring styrene. The thermoplastic resin composition of the present invention has excellent impact strength and satisfactorily low gloss.

8 Claims, No Drawings

STYRENE-BASED THERMOPLASTIC RESIN COMPOSITIONS WITH VERY LOW GLOSS AND HIGH IMPACT STRENGTH

TECHNICAL FIELD

The present invention relates to styrene-based thermoplastic resin compositions with very low gloss and high impact strength, more precisely, styrene-based thermoplastic resin compositions with very low gloss and high impact strength prepared by adding polyolefin copolymer containing glycidyl methacrylate functional group and styrene polymer harboring carboxyl functional group into basic resin composed of graft copolymer containing rubber-modified styrene and copolymer harboring styrene.

BACKGROUND ART

The consumption of thermoplastic resins like ABS and ASA resins is rising sharply in the fields of household, interior materials of car, office equipments, building materials, etc. Recently, the demand for nongloss resin to create elegant atmosphere is rising as consumers' sensitivity levels are going up. In addition, considering environmental problems, an effort has been made to exclude the processes of nonglare painting or pading, and to directly use nongloss resin instead.

For matting effect, the domain of roughness of resin surface is expanded over the range of visible ray to disperse incident light, and the following three methods are generally used.

These methods are mainly based on the method to improve the properties of acrylonitrile-butadiene-styrene resin. The first method is to use large size rubber particles more than 2 μm in diameter obtained from bulk polymerization, and the second method is to add nongloss filler whose particle size is over 5 an to resin. The third method is that monomers such as ethylene-unsaturated carboxylic acid are grafted as a modifier to acrylonitrile-butadiene-styrene copolymer prepared by emulsion polymerization.

However, the first method cannot guarantee low-gloss effect, and the decreases of impact strength and heat deflection temperature are also problems even when it shows low-gloss effect. Resin created by the second method shows excellent plasticity, but weakness in low-gloss and particularly in impact strength. The third method has been widely used to enhance non-gloss effect of resin since the resin produced by this method shows excellent low-gloss and good physical properties and increased impact strength. But, it also requires processing devices such as polymerization facilities, in addition to high cost owing to the great process-dependency.

The present inventors tried every effort to overcome the above problems and at last completed this invention by confirming that thermoplastic resin composition having enhanced workability and impact strength together with reduced gloss can be produced by simply adding low-gloss additive.

DISCLOSURE OF THE INVENTION

It is an object of the present invention, to solve the above problems, to provide styrene-based thermoplastic resin compositions having excellent impact strength but remarkably low gloss.

The object and intention of the present invention can be achieved by the following embodiments of the invention.

To achieve the above object, the present invention provides thermoplastic resin compositions in which 1-10 weight part of a low-gloss additive selected from a group consisting of polyolefin copolymer(C) containing glycidyl metha acrylate functional groups, styrene polymer(D) harboring two or more carboxyl functional groups per molecule, and a mixture of them, was added to 100 weight part of basic resin composed of 30-70 weight part of graft copolymer(A) containing rubber modified styrene and 30-70 weight part of copolymer(B) harboring styrene.

The above polyolefin copolymer(C) has 20,000-50,000 of weight average molecular weight and contains 6-15 glycidyl methacrylate functional groups per molecule.

Olefin forming main chain of the above polyolefin copolymer(C) can be propylene or ethylene.

The most preferable content of the above polyolefin copolymer(C) is 3-5 weight part.

The polyolefin copolymer(C) containing glycidyl methacrylate functional groups can include styrene polymer, and the ratio of polyolefin region having reaction group to styrene polymer region is 50:50-40:60.

The polyolefin copolymer(C) containing glycidyl methacrylate functional groups can also contain methacryl polymer, and the ratio of polyolefin region having reaction group to methacryl polymer region is 50:50-40:60.

The weight average molecular weight of styrene polymer (D) is 10,000-100,000.

The styrene polymer(D) preferably includes two or more, more preferably 2-100 carboxyl functional groups per molecule.

The most preferable content of the above styrene polymer (D) is 2-4 weight part.

Hereinafter, the present invention is described in detail.

The thermoplastic resin composition of the present invention is prepared by adding 1-10 weight part of a low-gloss additive selected from a group consisting of polyolefin copolymer(C) containing glycidyl methacrylate functional groups, styrene polymer(D) harboring more than 2 carboxyl functional groups per molecule, and a mixture of the two, to 100 weight part of basic resin composed of 30-70 weight part of graft copolymer(A) containing rubber modified styrene and 30-70 weight part of a copolymer harboring styrene. Each component is described in detail hereinafter.

(A) Graft Copolymer Containing Rubber Modified Styrene

The g raft copolymer containing rubber modified styrene of the present invention is prepared by graft copolymerization of aromatic vinyl compound and vinyl cyan compound in the presence of 30-60 weight % of butadiene rubber, in which 90% of rubber particles are in the size of 0.1-0.5 μm. It is preferred to use styrene monomer derivatives such as styrene, alpha-methylstyrene, and para-methylstyrene as an aromatic vinyl compound for grafting. It is more preferred to use styrene. The preferable content of the aromatic vinyl compound in graft copolymer(A) is 10-40 weight %.

It is preferred to use acrylonitrile as a vinyl cyan compound, and the preferable content of the compound in graft copolymer(A) is 10-40 weight %. When the content of the vinyl cyan compound like acrylonitrile is over or under the above range, mechanical properties of the composition might be reduced.

The preferable embodiment for graft copolymer(A) of the invention is styrene-acrylonitrile-butadiene graft copolymer, whose graft content is 50-100% and weight average molecular weight is 50,000-150,000.

The content of graft copolymer(A) containing rubber modified styrene of the present invention is 30-70 weight part for 100 weight part of basic resin.

(B) Copolymer Containing Styrene

A copolymer containing styrene can be the copolymer of the above aromatic vinyl compound and the vinyl cyan compound explained in the above component (A), which is generally produced by continuous bulk polymerization. The preferable aromatic vinyl compound is exemplified by styrene monomer, more specifically, styrene, alpha-methylstyrene, and para-methylstyrene. Acrylonitrile is preferably used as a vinyl cyan compound.

The styrene-acrylonitrile copolymer prepared above contains styrene by 68-76 weight % and acrylonitrile by 24-32 weight %.

The content of the copolymer resin composed of aromatic vinyl compound and vinyl cyan compound of the invention is 30-70 weight part for 100 weight part of basic resin.

In the present invention, polyolefin copolymer(C) containing glycidyl metha acrylate functional groups and styrene polymer(D) harboring two or more carboxyl functional groups per molecule can be used as a low-gloss additive singly or jointly as a mixture. These low-gloss additives enhance low-gloss effect greatly by synergism.

(C) Polvolefin Copolymer Containing Glycidyl Methacrylate Functional Groups

The polyolefin copolymer containing glycidyl methacrylate functional groups, used as a low-gloss additive, of the present invention indicates a copolymer composed of one or more compounds selected from a group consisting of polyolefin containing glycidyl methacrylic acid by over 1 weight %, acrylate compound (for example; methyl methacrylate (MMA)), aromatic vinyl compound (for example; styrene), and vinyl cyan compound (for example; acrylonitrile). More specifically, the copolymer can be selected among ethylene/glycidyl methacrylic acid-methyl methacrylate copolymer, ethylene/glycidyl methacrylic acid-styrene copolymer, ethylene/glycidyl methacrylic acid-styrene/acrylonitrile copolymer, propylene/glycidyl methacrylic acid-methyl methacrylate copolymer, propylene/glycidyl methacrylic acid-styrene copolymer, and propylene/glycidyl methacrylic acid-styrene/acrylonitrile copolymer.

The effective content of the above component (C) in the present invention is 1-10 weight part, preferably 3-8 weight part, and more preferably 3-5 weight part for 100 weight part of basic resin. When the content is less than 1 weight part, gloss is not much reduced. In the meantime, when the content is over 10 weight part, production cost goes up and physical properties of final composition are degraded.

The polyolefin copolymer(C) above has 20,000-50,000 of weight average molecular weight, and 6-15 glycidyl methacrylate functional groups per molecule.

The olefin forming main chain for the above polyolefin copolymer(C) can be propylene or ethylene.

The polyolefin copolymer(C) containing glycidyl methacrylate functional groups can include styrene polymer and the preferable ratio of polyolefin region having reaction group to styrene polymer region is 50:50-40:60.

The above polyolefin copolymer(C) containing glycidyl methacrylate functional groups can include methacrylic polymer, and the preferable ratio of polyolefin region having reaction group to methacrylic polymer region is 50:50-40:60.

(D) Styrene Polymer Containing Two or More Carboxyl Functional Groups Per Molecule Styrene polymer used as a low-gloss additive harbors at least two carboxyl functional groups per molecule, and has repetitive unit of styrene-acrylonitrile-butadiene.

The weight average molecular weight of the styrene polymer(D) is 10,000-100,000.

And it is preferred for the styrene polymer(D) to contain at least two, more preferable 2-100 carboxyl functional groups in a molecule.

In the present invention, the content of the component (D) is 1-10 weight part, preferably 2-7 w eight part, and more preferably 2-4 w eight p art for 100 weight part of basic resin. When the content is less than 1 weight part, gloss is not much reduced. In the meantime, when the content is over 10 weight part, mechanical properties of the composition are reduced.

The thermoplastic resin composition of the present invention can additionally include heat stabilizer, antioxidant, lubricant, releasing agent, light stabilizer, UV stabilizer, flame retardant, antistatic agent, coloring agent, filler, and impact modifier, etc, and co-application of other resins or rubber components is also possible.

The above components can be added simultaneously by using a device such as extruder or one by one, regardless of order, and they should be blended enough until the reaction is completed under the regular reaction time and temperature.

BEST MODE FOR CARRYING OUT THE INVENTION

Followings are preparations and options for (A) styrene-acrylonitrile-butadiene graft copolymer, (B) styrene-acrylonitrile copolymer, (C) polyolefin copolymer containing glycidyl methacrylate functional groups and (D) styrene polymer harboring at least two carboxyl functional groups per molecule, which would be used in the following examples and comparative examples.

(A) Styrene-Acrylonitrile-Butadiene Graft Copolymer

Graft copolymerization was performed with 50 weight part of butadiene rubber latex (0.3-0.4 µm in diameter), 30 weight part of styrene compound, 20 weight part of acrylonitrile compound, 0.3 weight part of emulsifier, 0.4 weight part of MW regulator, and 0.3 weight part of polymerization initiator. Conventional emulsifier, MW regulator and polymerization initiator can be used in the present invention. Multistep intermittent administration or continuous administration is preferred to enhance graft efficiency and minimize the generation of coagulum. Upon completion of polymerization, the produced latex showed over 96% of polymerization conversion ratio. Antioxidant and stabilizer were added to the latex, followed by coagulation with aqueous sulfuric acid solution at over 80° C. The product was hydrated and dried to give ABS powder.

(B) Styrene-Acrylonitrile Copolymer

Styrene-acrylonitrile copolymer, in which styrene-acrylonitrile resin, a matrix component produced by the conventional bulk polymerization, has 150,000 of weight average molecular weight and the content of acrylonitrile therein is 24 weight %, was used in this invention.

(C) Polyolefin Copolymer Containing Glycidyl Methacrylate Functional Groups

In the preferred embodiment of the present invention, the following (C-1) and (C-2) components were used as the components for (C), and (C-3) was used instead of (C) in comparative examples 1-3.

(D) Styrene (Co)Polymer Containing Two or More Carboxyl Functional Groups Per Molecule

Examples 1~6

Each component produced above was mixed by the ratio shown in Table 1, resulting in pellet by extruding using twin screw extruder. The prepared resin pellet was injected at 230° C. for evaluation, and the results are shown in Table 1. Equal amount of rubber was added to total resin composition.

Physical properties of samples prepared in examples were investigated by the following methods.

i) Izod impact strength (¼ notched at 23° C., kg·cm/cm)—measured by ASTM D256.

ii) Tensile strength (50 mm/min, kg/cm$^2$)—measured by ASTM D638.

iii) Gloss—measured at the standard angles 45 and 60 by ASTM D523.

TABLE 1

|  |  | Examples |  |  |  |  |  |
|---|---|---|---|---|---|---|---|
|  |  | 1 | 2 | 3 | 4 | 5 | 6 |
| (A) ABS |  | 35 | 35 | 35 | 35 | 35 | 35 |
| (B) SAN |  | 65 | 65 | 65 | 65 | 65 | 65 |
| (C) | C)-1 | 5 | 5 | 5 | — | 3 | — |
|  | C)-2 | — | — | — | 5 | — | 3 |
|  | C)-3 | — | — | — | — | — | — |
| (D) | D)-1 | — | — | 3 | — | — | — |
|  | D)-2 | — | 3 | — | 3 | 2 | 2 |
| Physical Property | Impact strength | 35 | 30 | 30 | 28 | 28 | 29 |
|  | Tensile strength | 443 | 454 | 452 | 456 | 462 | 460 |
|  | Gloss(40°) | 13 | 7 | 10 | 15 | 15 | 19 |
|  | Gloss(60°) | 16 | 8 | 11 | 16 | 17 | 20 |

As shown in Table 1, compositions of examples 5 and 6 which were added with components (C) and (D) together showed low gloss but enhanced impact strength, minimizing the weakness of tensile strength. Compositions of examples 2 and 3 which were treated with increased amount of components (C) and (D) showed the best impact strength and very low gloss. Composition of example 1 which was added only with component (C) showed excellent impact strength and low gloss even though a slight weakness of tensile strength was observed.

Comparative Example 1

Whole procedure was the same as performed in example 1 except using glycidyl metha acrylic acid-styrene/acrylonitrile copolymer instead of ethylene/glycidyl methacrylic acid-styrene/acrylonitrile copolymer.

Comparative Example 2

Whole procedure was the same as performed in example 2 except using glycidyl metha acrylic acid-styrene/acrylonitrile copolymer instead of ethylene/glycidyl methacrylic acid-styrene/acrylonitrile copolymer.

Comparative Example 3

Whole procedure was the same as performed in example 3 except adding glycidyl metha acrylic acid-styrene/acrylonitrile copolymer by 10 weight part instead of ethylene/glycidyl methacrylic acid-styrene/acrylonitrile copolymer.

Comparative Example 4

Whole procedure was the same as performed in example 1 except adding ethylene/glycidyl methacrylic acid-styrene/acrylonitrile copolymer by 12 weight part.

Comparative Example 5

Whole procedure was the same as performed in example 1 except adding ethylene/glycidyl methacrylic acid-methyl metha acrylate copolymer by 12 weight part.

TABLE 2

|  |  | Comparative Examples |  |  |  |  |
|---|---|---|---|---|---|---|
|  |  | 1 | 2 | 3 | 4 | 5 |
| (A) ABS |  | 35 | 35 | 35 | 35 | 35 |
| (B) SAN |  | 65 | 65 | 65 | 65 | 65 |
| (C) | C)-1 | — | — | — | 12 | — |
|  | C)-2 | — | — | — | — | 12 |
|  | C)-3 | 5 | 5 | 10 | — | — |
| (D) | D)-1 | — | — | 3 | — | — |
|  | D)-2 | — | 3 | — | — | — |
| Physical Property | Impact strength | 19 | 18 | 10 | 39 | 39 |
|  | Tensile strength | 464 | 469 | 481 | 416 | 428 |
|  | Gloss(45°) | 32 | 22 | 10 | 9 | 9 |
|  | Gloss(60°) | 36 | 27 | 14 | 11 | 13 |

As shown in Table 2, gloss was not much decreased but impact strength was significantly reduced in compositions of comparative examples 1 and 3, which were produced not by polyolefin copolymer containing glycidyl methacrylate functional groups but by glycidyl methacrylic acid-styrene/acrylonitrile copolymer. The only difference between compositions of comparative example 1 and example 1 was the presence or absence of polyolefin, but the difference of gloss between them was great, that is gloss observed in composition of example 1 was decreased twice as much as that shown in composition of comparative example 1. Compositions of comparative examples 4 and 5, which were added with increased amount of (C-1), showed excellent impact strength and low gloss, but had weak tensile strength. And gloss was much reduced, compared with that of compositions of examples.

INDUSTRIAL APPLICABILITY

As explained hereinbefore, the present invention provides thermoplastic resin compositions having excellent impact strength and low gloss by adding polyolefin copolymer containing glycidyl methacrylate functional groups and/or styrene polymer harboring at least two carboxyl functional groups in a molecule to basic resin composed of graft copolymer containing rubber modified styrene and copolymer harboring styrene.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A thermoplastic resin composition in which 1-10 weight part of a low-gloss additive of polyolefin copolymer (C) containing glycidyl methacrylate functional groups and styrene polymer (D) harboring two or more carboxyl functional groups per molecule, is added to 100 weight part of basic resin composed of 30-70 weight part of graft copolymer (A) containing rubber modified styrene and 30-70 weight part of copolymer (B) harboring styrene, wherein the olefin forming main chain for the polyolefin copolymer (C) is propylene or ethylene and weight average molecular weight of polyolefin copolymer (C) is 20,000-50,000.

2. The thermoplastic resin composition as set forth in claim 1, wherein the content of polyolefin copolymer(C) is 3-5 weight part.

3. The thermoplastic resin composition as set forth in claim 1, wherein the polyolefin copolymer(C) characteristically contains 6-15 glycidyl methacrylate functional groups per molecule.

4. The thermoplastic resin composition as set forth in claim 1, wherein the content of styrene polymer(D) is 2-4 weight part.

5. The thermoplastic resin composition as set forth in claim 1, wherein the weight average molecular weight of styrene polymer(D) is 10,000-100,000.

6. The thermoplastic resin composition as set forth in claim 1, wherein the styrene polymer(D) characteristically contains 2-100 carboxyl functional groups per molecule.

7. The thermoplastic resin composition as set forth in claim 1, wherein the polyolefin copolymer(C) containing glycidyl methacrylate functional groups is mixed with styrene polymer and the ratio of polyolefin region having reaction group to styrene polymer region is 50:50-40:60.

8. The thermoplastic resin composition as set forth in claim 1, wherein the polyolefin copolymer(C) containing glycidyl methacrylate functional groups is mixed with methacrylic polymer, and the ratio of polyolefin region having reaction group to methacrylic polymer region is 50:50-40:60.

* * * * *